United States Patent
Gentry

(10) Patent No.: US 8,091,580 B2
(45) Date of Patent: Jan. 10, 2012

(54) PILOT SWITCH

(75) Inventor: Kevin Grant Gentry, Oklahoma City, OK (US)

(73) Assignee: Kimray, Inc., Oklahoma City, OK (US)

( * ) Notice: Subject to any disclaimer, the term of this patent is extended or adjusted under 35 U.S.C. 154(b) by 471 days.

(21) Appl. No.: 12/284,743

(22) Filed: Sep. 25, 2008

(65) Prior Publication Data

US 2010/0071784 A1    Mar. 25, 2010

(51) Int. Cl.
*F16K 31/18* (2006.01)
(52) U.S. Cl. ......... 137/426; 137/415; 137/485; 137/605
(58) Field of Classification Search .................. 137/415, 137/485, 602, 605, 426
See application file for complete search history.

(56) References Cited

U.S. PATENT DOCUMENTS

| | | | | |
|---|---|---|---|---|
| 3,561,468 A | * | 2/1971 | Sugden, Jr. | 137/269 |
| 3,729,018 A | * | 4/1973 | Butterfield | 137/469 |
| 4,974,625 A | | 12/1990 | Paulius et al. | |
| 5,992,448 A | | 11/1999 | Anderson et al. | |
| 6,042,081 A | * | 3/2000 | Anderson | 251/61.5 |
| 6,135,142 A | | 10/2000 | Yokota et al. | |
| 6,240,955 B1 | | 6/2001 | Anderson et al. | |
| 6,354,323 B1 | | 3/2002 | Anderson | |
| 6,820,641 B2 | * | 11/2004 | Larsen | 137/491 |
| 7,204,143 B1 | | 4/2007 | Nicewarner | |
| 7,392,822 B2 | | 7/2008 | Kimmell | |

* cited by examiner

*Primary Examiner* — Kevin Lee
(74) *Attorney, Agent, or Firm* — McAfee & Taft

(57) ABSTRACT

A pilot valve is switchable between snap and throttle modes. The pilot valve supplies output gas to a process control valve and has an adjustable biasing member for applying an adjustable force to a pilot plug in a pilot body interior. An opposed force is applied to the pilot plug to overcome the adjustable force and the output gas.

18 Claims, 9 Drawing Sheets

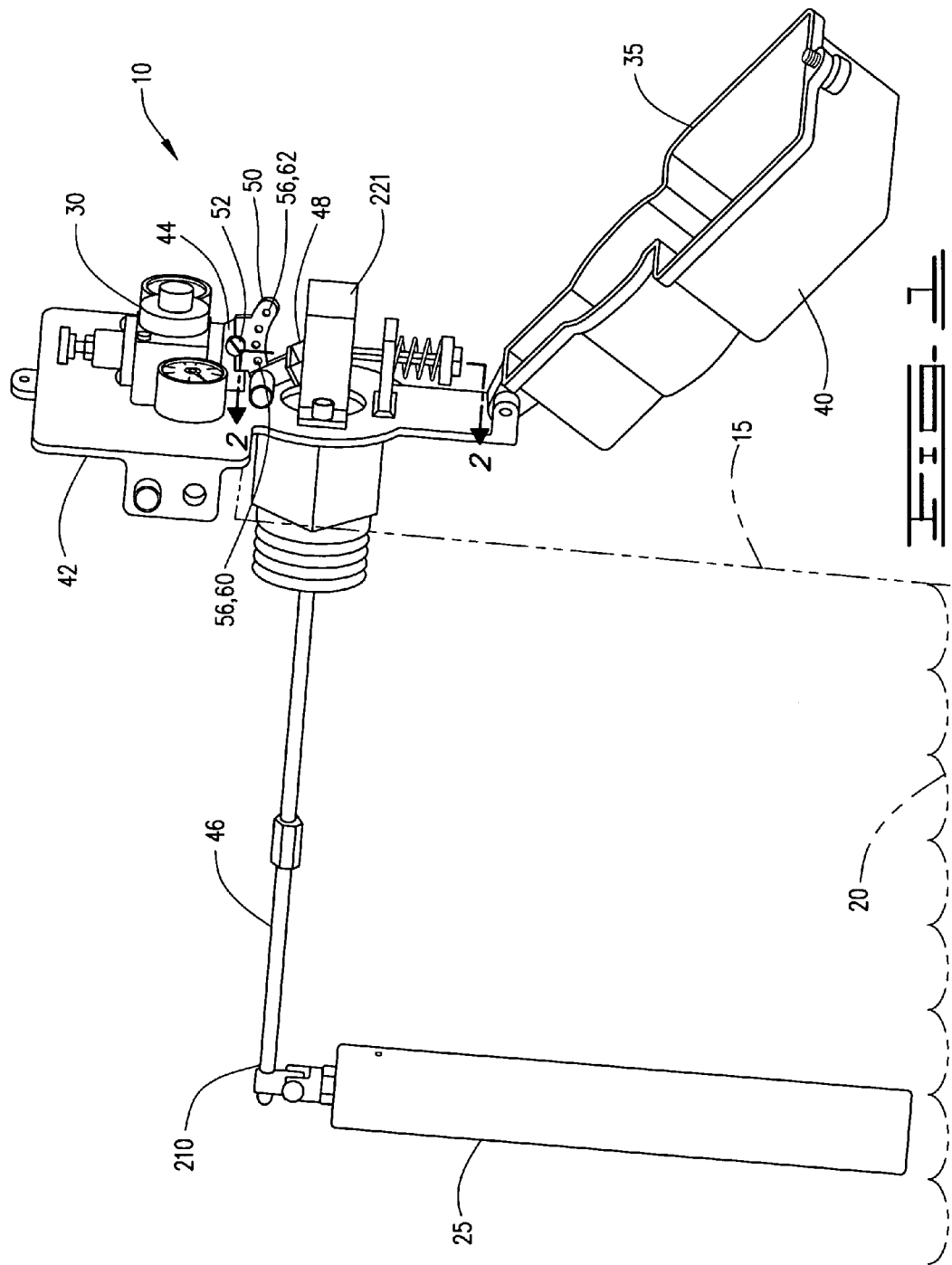

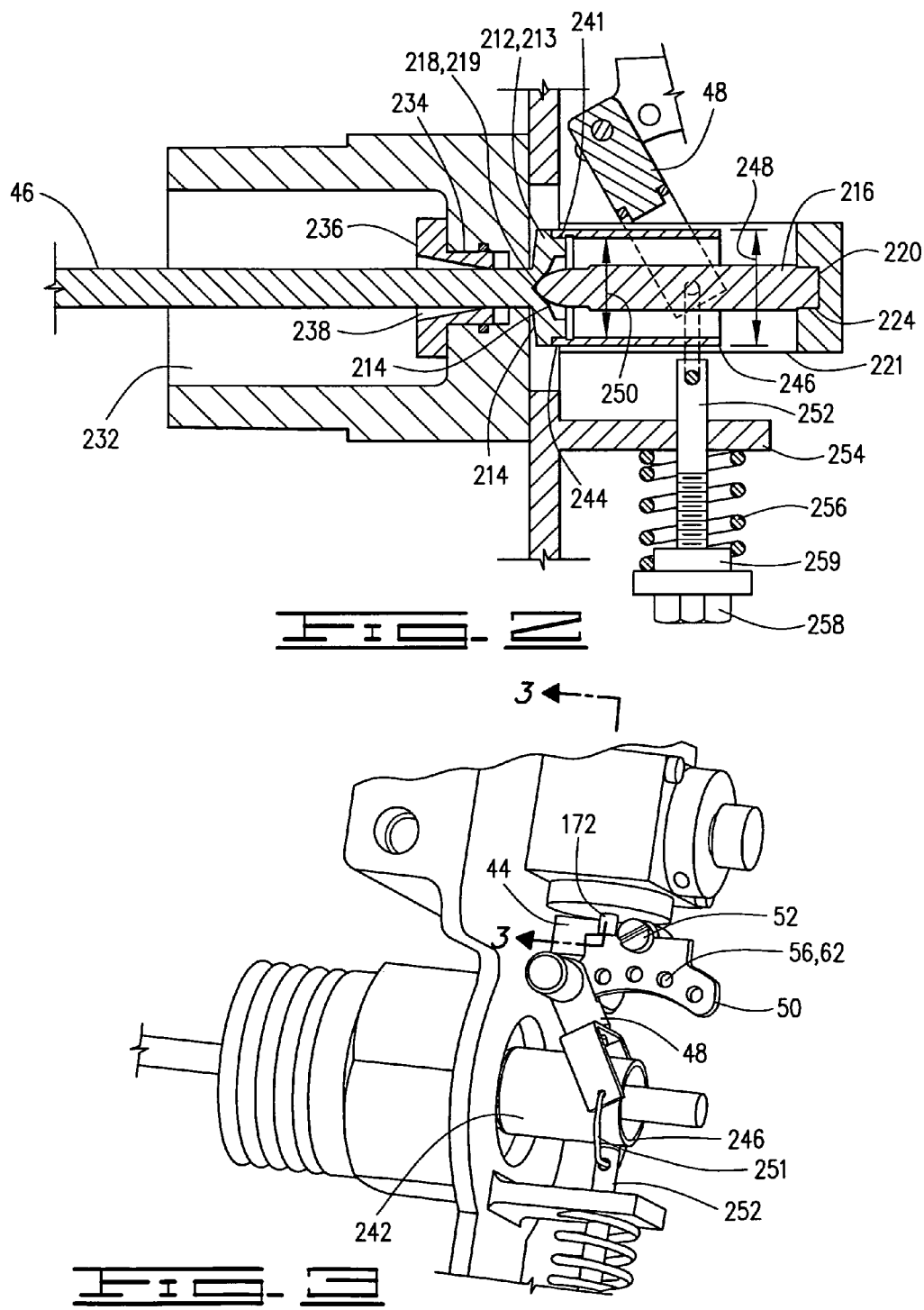

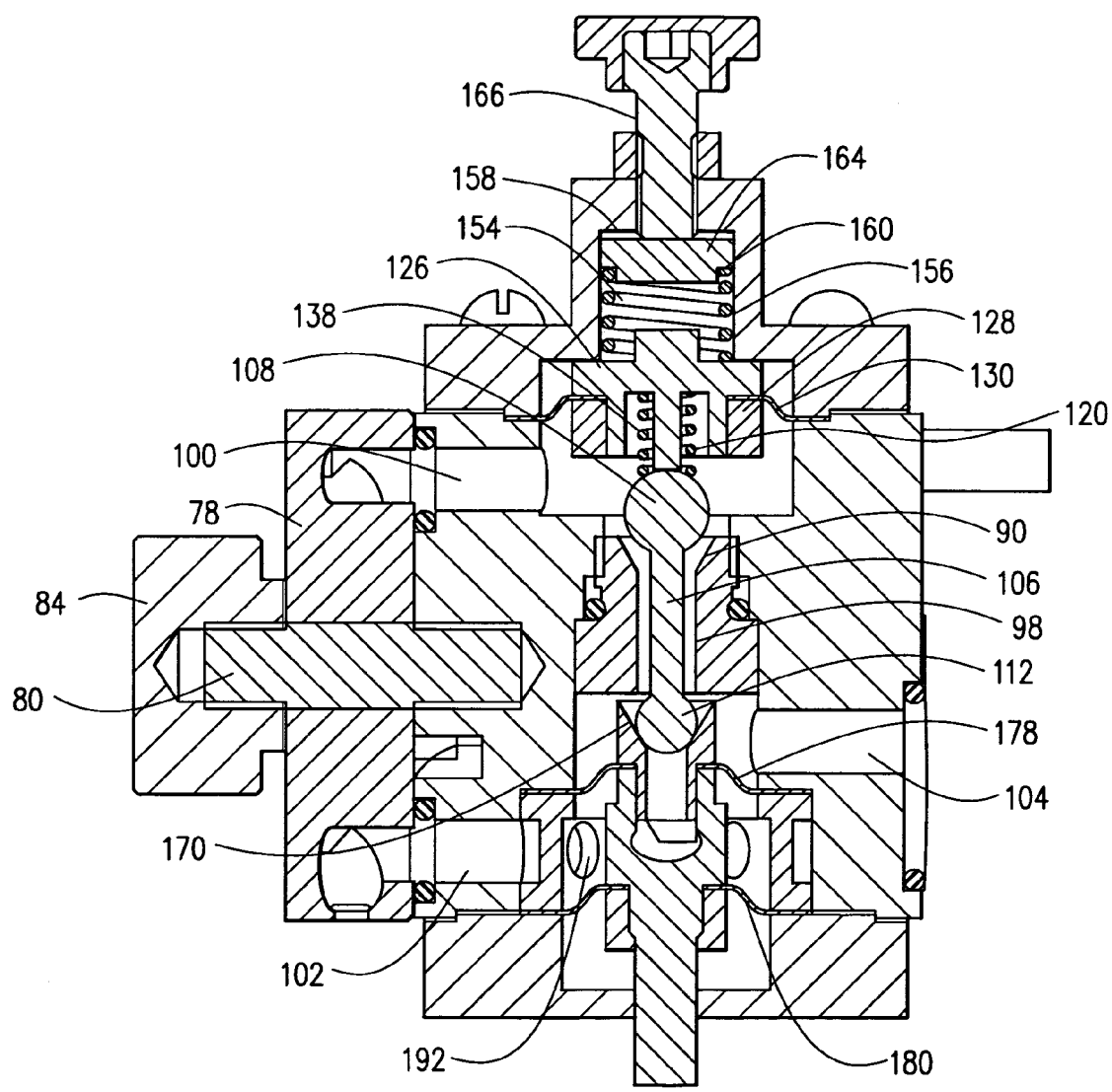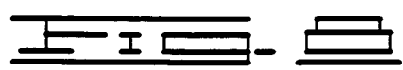

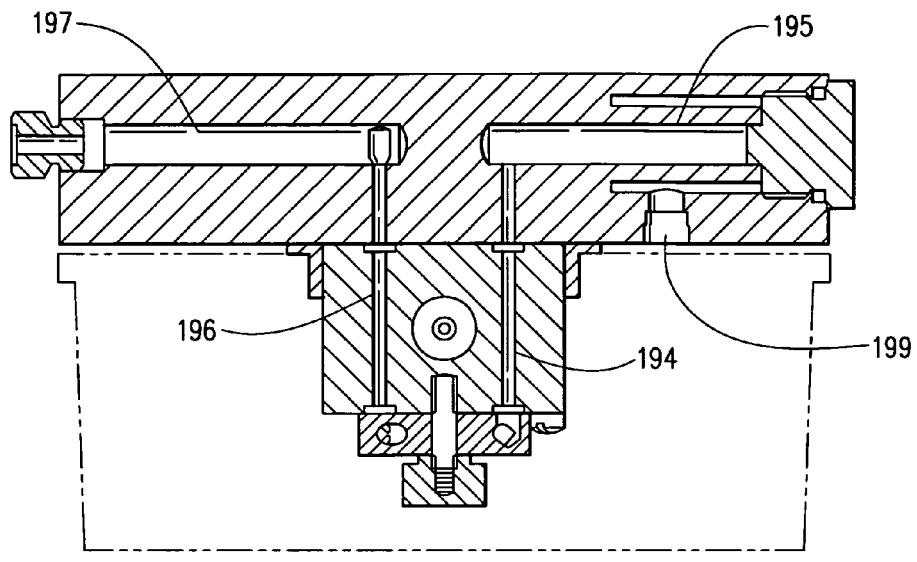
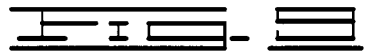
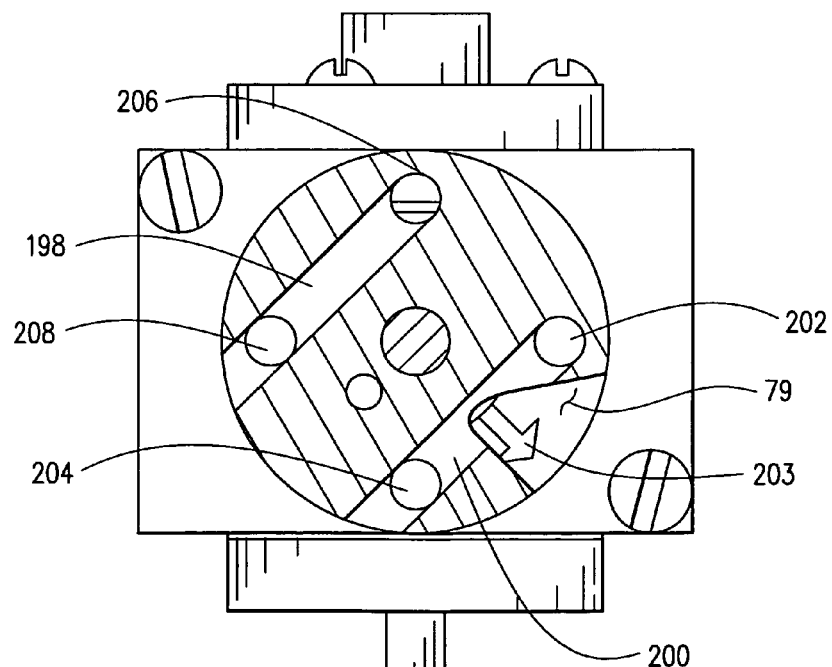
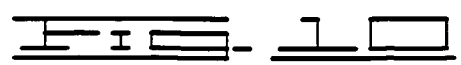

PILOT SWITCH

BACKGROUND

The present invention relates generally to a pilot valve and more specifically to a pilot valve that is selectively switchable between modes of operation and is adjustable in at least one mode of operation.

As is known in the art, pilot valves are used in a number of different industries, typically to control process conditions or parameters, by controlling the operation of a process control unit, such as a process control valve. Numerous industries utilize process control valves to control the rate of flow of liquid and to control the level of liquid in tanks and vessels. The process control valves in many cases are operated with a control signal, which may be, for example, a pneumatic signal transmitted from a pilot valve. In such a case, the liquid level in a tank or other vessel may be sensed with a float or other element which moves when the liquid reaches a certain level. Movement of the float will actuate a control device, such as a pilot valve, which will send a signal to the process control valve to open or close the process control valve to either allow flow of liquid from the vessel or to prevent flow therefrom.

In the oil and gas industry, liquid level controllers may be used to control the level of oil, water or other liquids in a tank or other vessel. Liquid level controllers may include a float, or displacer placed inside the tank. When the liquid level in the tank is such that it engages the displacer, the displacer will move as the level of the liquid changes. The changes in the liquid level are transmitted to a pilot valve which will signal the process control valve to either open or close in response to the changing liquid level in the tank which will either allow flow or stop flow from the tank.

The pilot valve may be a pneumatic pilot valve to which a supply gas is provided. The pilot valve will direct the supply gas to the process control valve depending upon the level of liquid in the tank and the process control valve will open or close depending on the signal received from the pilot valve. When the process control valve is a pressure to open the valve, the pilot valve will modulate output gas to the control valve which will open the control valve. Liquid level controllers may be referred to as direct and throttle in operation if an increase in the level in the tank results in a proportional increase in outlet pressure from the pilot valve to the process control valve. In such a case the process control valve may move from closed to partially open and ultimately to fully open or anywhere in between the fully open and fully closed positions since the gas pressure supplied to the process control valve from the pilot valve will vary.

When the pilot valve is in snap mode, the pilot valve provides a sudden increase in output pressure, or a sudden decrease to the process control valve so that the control valve will open fully, or close fully, almost immediately. For example, in a direct snap mode, when the level of liquid in the tank increases and moves the displacer to a predetermined level, there will be a sudden increase in output pressure from the pilot valve which will cause the pressure to open the process control valve to move almost immediately from the fully closed to a fully open position to discharge liquid from the tank. When the liquid level falls to a preselected lowermost level, a sudden decrease in output pressure from the pilot valve will occur, which will cause the process control valve to move from the fully open to the fully closed position.

U.S. Pat. No. 7,392,822, assigned to the assignee of the current application and incorporated herein by reference discloses a pilot valve that is selectively switchable between snap and throttle modes. While the pilot switch disclosed therein works well, there is a continuing need for pilot valves that are switchable between modes, and that are adjustable to provide for opening and closing of a process control valve over a range of liquid level changes.

SUMMARY

The current invention is directed to a pilot valve and more specifically to a pilot valve or pilot switch that is selectively switchable between throttle and snap modes and that is adjustable in the snap mode to provide for a range of liquid level changes on associated tanks.

The pilot valve of the current invention is described in connection with a liquid level controller. The pilot valve may be used in other environments, however, where the measured parameter is something other than liquid level. The pilot valve can, based on the magnitude of a measured parameter, send a pneumatic signal to a process control unit to regulate a process, or to cause a notification or alarm based on the state of the measured parameter.

The pilot valve of the current invention includes a pilot body which has a first, or throttle supply gas inlet, a second, or snap supply gas inlet and a single gas output passage. Supply gas entering either of the supply gas inlets that exits through the gas output passage may be referred to as output gas, which is preferably a modulated output gas, and creates output pressure to the process control unit. In the current embodiment, the process control, or receiving unit, may comprise a process control valve which controls the discharge of liquid from a vessel. The pilot valve is selectively switchable between throttle and snap modes and is preferably switchable simply by rotating a switch plate which will selectively direct supply gas to either the throttle supply gas inlet or the snap supply gas inlet. When the pilot valve is in snap mode, the throttle gas inlet acts as a vent passage. In the throttle mode, the snap supply gas inlet acts as a vent passage. The pilot body defines a pilot body interior through which supply gas may pass from the snap supply inlet or the throttle supply inlet to the output passage, also referred to as the modulated gas outlet or simply the output gas outlet.

A pilot plug is movably disposed in the pilot body interior and has first and second sealing elements connected to one another by a pilot plug stem. The first sealing element, which may be referred to as a first sealing ball, and the second sealing element, which may be referred to as the second sealing ball are movable and engageable with first and second seats in the pilot body interior. A movable actuator is disposed in the pilot body interior, and has a first end and a second end wherein the second end extends outwardly to an exterior of the pilot body. The liquid level controller includes a displacer positioned inside a tank or vessel. A waggle arm, which may also be referred to as a displacement member, is connected at one end to the displacer and has a second end that engages an end of a pivot rod. The vertical or up-and-down movement of the displacer will cause the second end of the waggle arm to move. A connecting link will translate the up-and-down movement of the waggle arm to a tangent arm. The tangent arm will transmit the force applied due to the change in the liquid level, or other sensed parameter, to the pilot valve.

The tangent arm will engage and move the actuator in the pilot valve or will disengage from the actuator depending upon the liquid level and the mode of the pilot valve. Movement of the actuator and other components will open and/or close passages to either supply or shut off output gas to the process control valve as will be described in more detail herein.

In snap mode, when output gas is being supplied to the process control valve, the first sealing ball will be engaged with the first seat, and the second sealing ball will be disengaged from the second seat when the liquid level has reached a level such that the process control valve is to be in an open state. Supply gas will be directed through the second supply gas inlet, through the space or passage between the second sealing ball and the second seat, through the output gas outlet. The output gas from the output gas outlet will apply output gas pressure to the process control valve, to move, and maintain the process control valve in the first, or open state.

A force applied to the pilot plug will hold the first sealing ball in engagement with the first seat. To shut off the supply gas and vent the output gas pressure to move the process control valve to its second, or closed state, an opposing force must be applied to the movable actuator to cause the second seat to engage the second sealing ball and move the pilot plug upwardly, so that the first sealing ball disengages the first seat. When the second seat engages the second sealing ball, the gas supply is shut off, and when the first sealing ball disengages the first seat, output gas pressure is vented. The process control valve will move to the closed state when the output gas pressure is vented, or relieved. The amount of force applied to the pilot plug to hold the pilot plug in engagement with the first seat in snap mode can be adjusted so that the opposing force required to move the pilot plug is adjustable. The opposing force is applied by the tangent arm, which results from the liquid level changes causing the displacer to apply a force to the waggle arm, and thus to the tangent arm. Thus, when the pilot valve is used with a liquid level controller, the movable actuator moves in response to the changes in liquid level which causes the displacer to move. Because the force applied to the pilot plug is adjustable, the amount of force necessary to move the pilot plug can be changed. The liquid level at which the displacer applies sufficient force to move the actuator and the pilot plug will change, so that the pilot valve provides for a range or span of liquid level changes over which the pilot valve will operate.

BRIEF DESCRIPTION OF THE DRAWINGS

FIG. 1 is a view of a liquid level controller of the current disclosure.

FIG. 2 is a partial cross section showing internal components of the liquid level controller.

FIG. 3 is a view showing the connecting link and tangent arm.

FIG. 6 shows the position of the pilot plug and the actuator in snap mode when the tangent arm is disengaged from the actuator.

FIG. 8 shows the position of the actuator and the pilot plug when fluid has risen such that the displacer will cause the actuator to move upwardly and thus move the pilot plug upwardly to the position shown.

FIG. 9 is a top partial section view showing passageways for supply and vent gas.

FIG. 10 is a partial section view of a selector switch showing the passageways for supply and vent gas.

DETAILED DESCRIPTION OF A PREFERRED EMBODIMENT

Figure 4:
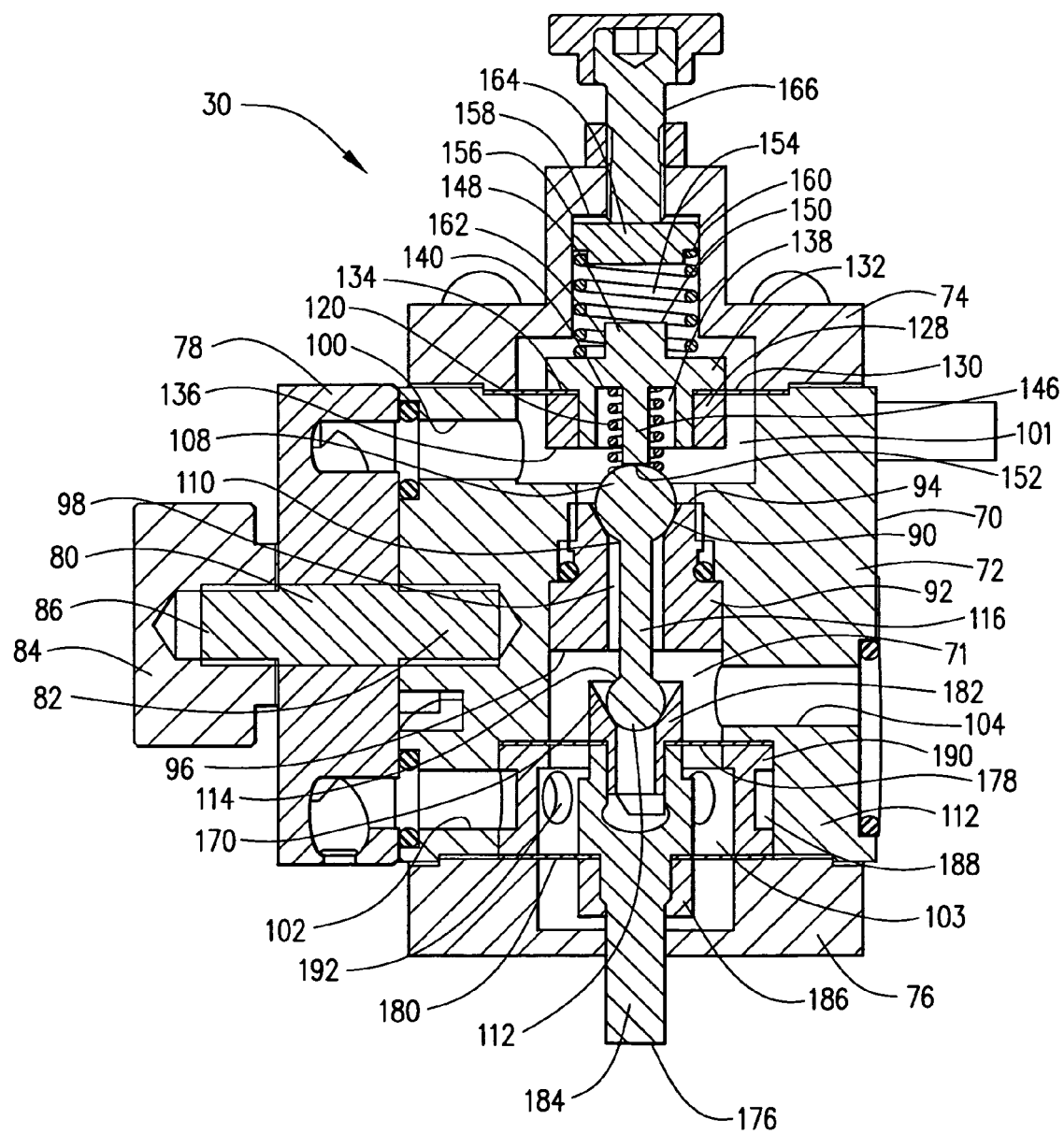
FIG. 4 is a cross-sectional view of the pilot valve from line 3-3 of FIG. 3.

Referring now to the drawings, liquid level controller 10 is shown and described. Liquid level controller 10 may be positioned adjacent the side of a tank 15 with a liquid level 20. In the embodiment shown, liquid level controller 10 is a back-mounted liquid level controller but other configurations are possible. Liquid level controller 10 includes a displacer 25 and a pilot switch or pilot valve 30 disposed in a housing 35. Housing 35 is shown in an open position in FIG. 1, and has a front panel 40 and a rear panel 42. A pivot plate 44 extends from rear panel 42. A waggle arm 46, which may be referred to as a displacement arm 46, and a connecting link assembly 48 are utilized to connect displacer 25 to a tangent arm 50 such that as the liquid level changes, displacer 25 will cause a moving force to be applied to tangent arm 50 with connecting link 48. Tangent arm 50, which may be referred to as an actuator arm, is pivotally attached to housing 35 and in the embodiment shown is pivotally attached to pivot plate 44 at a pivot point 52.

Tangent arm 50 has a plurality of connecting points 56. When viewed from the direction shown in FIG. 1, tangent arm 50 has a plurality of connecting points 56 on the left or first side of pivot point 52, which is toward the rear panel 42, and a plurality of connecting points 56 on the right or second side of pivot point 52, which is forward of pivot point 52. Connecting points 56 on the left side may be referred to as connecting points 60 and the right side connecting points may be referred to as connecting points 62.

Details of the pilot valve will be described with reference to FIGS. 4-8. Pilot valve 30 comprises a pilot body 70 which defines pilot body interior 71. Pilot body 70 may include central body portion 72 and upper or cap portion 74 connected thereto with connectors, such as screws, or other means known in the art and a lower portion or base portion 76 which may be connected with screws or other connectors, or otherwise connected to central body portion 72. A selector knob 78, which may also be referred to as a switch plate, having outer surface 79 is mounted to pilot body 70 with a post 80 which may be threaded into pilot body 70 at a first end 82 thereof and may have a lock nut or other locking means 84 threaded to the opposite end 86 thereof.

The pilot body has first seat 90 which may be referred to as first seat 90 or upper seat 90. First seat 90 may be defined on a seat body 92 at an upper end 94 thereof. Seat body 92 may be threaded or otherwise fixed in pilot body interior 71. Seat body 92 has lower end 96 and defines a passageway 98 therethrough. Pilot body 70 defines a first supply gas inlet 100 and a second supply gas inlet 102 and defines a single gas outlet 104 for providing output gas to a process control valve (not shown). Pilot valve 30 may be utilized to move a process control valve from a first state, to a second state. For example, if the process control valve is a flow control valve, pilot valve 30 may be used to move the valve between the open, or first state, and the closed, or second state.

First supply gas inlet 100 may be referred to as the throttle supply gas inlet and second supply gas inlet 102 may be referred to as the snap supply gas inlet. As will be explained in more detail hereinbelow, selector knob 78 may be utilized to selectively direct supply gas to either of the first or second supply gas inlets 100 and 102. Both of supply gas inlets 100 and 102 are configured to direct supply gas into pilot body interior 71 when selector knob 78 is rotated to direct supply gas into one of inlets 100 and 102. Pilot valve 30 is selectively switchable between snap and throttle modes with selector knob 78. No connection changes or other modifications are required to change between snap and throttle modes. All that is required is rotation of selector knob 78. In the throttle mode, supply gas is directed to first or throttle supply gas inlet 100 while in the snap mode, supply gas is directed through second or snap supply gas inlet 102. Throttle supply gas inlet 100 will direct supply gas into throttle chamber 101, and snap supply gas inlet will direct supply gas into snap chamber 103.

Throttle mode as it is referred to herein means that increases and decreases in the liquid level in the tank result in proportional increases or decreases in output gas, or output pressure to the process control valve from pilot valve 30. Because the increases and decreases in output pressure are proportional, the process control valve may be moved to partially open positions, and may be positioned anywhere between fully open and fully closed positions so that the flow rate out of the vessel changes with changes in output pressure.

With the pressure to open process control valve described in the current embodiment, in direct snap mode output pressure from the pilot valve 30 is increased suddenly when the level in the tank increases to the preselected uppermost level, which will cause the process control valve to open suddenly. The output pressure will be shut off suddenly when the liquid level in the tank reaches a selected lowermost level. The snap and throttle modes described herein are "direct" connected, which means that output gas pressure from the pilot valve increases in response to the liquid level increase. The process control valve in such cases is designed to open in response to the output gas pressure. The liquid level controller can be configured to be connected "indirect," in which case output pressure from the pilot valve 30 increases when liquid level decreases, and output pressure from the pilot valve decreases when liquid level increases. The process control valve in such cases is designed to close as a result of the output gas pressure.

A pilot plug 106 is disposed in pilot body interior 71 and is movable therein. Pilot plug 106 has a first sealing ball or first sealing plug 108 at the upper or first end 110 thereof and has a second or lower sealing plug which may be referred to as a lower sealing ball 112 at the second or lower end 114 thereof. Sealing plugs 108 and 112 may be referred to as first and second sealing elements 108 and 112, respectively, and are connected with a pilot plug stem 116.

A throttle spring 120 which may be referred to as first spring 120, is positioned to engage first plug 108. Throttle spring 120 has first or upper end 122 and second or lower end 124. A first, or lower spring plate 126 is pressed, or otherwise fixed in a spring sleeve 128 in pilot body interior 71. A diaphragm 130, which may be referred to as a spring diaphragm 130 is captured between a shoulder 132 of lower spring plate 126 and an upper end 134 of spring sleeve 128 which also has lower end 136. Spring diaphragm 130 is also captured between upper portion 74 and central body portion 72 of pilot body 70. Spring diaphragm 130 is preferably made from an elastomer, a Teflon-type material, or other material that will move or flex.

Lower spring plate 126 defines a spring cavity 138 in which at least a portion of throttle spring 120 is housed. An upper end 140 of spring cavity 138 is engaged by upper end 122 of throttle spring 120. Lower end 124 of throttle spring 120 engages first sealing plug 108 and applies force thereto in a direction to urge first plug 108 toward and into engagement with first seat 90, which is the downward direction in the embodiment shown in the drawings. A push rod 142, which may be integrally formed with lower spring plate 126 comprises a vertical leg 146. A spring guide 148 is formed on lower spring plate 126. Spring diaphragm plate 126 has upper or first end 150 and second or lower end 152 which is also the end of push rod 142. A snap spring 154, which may be referred to as second spring 154, is positioned to engage lower spring plate 126 and is positioned in a snap spring cavity 156 which comprises a portion of pilot body interior 71. Snap spring cavity 156 has an upper end 158 which is defined by cap portion 74. Snap spring 154 has an upper end 160 and a lower end 162. An upper spring plate 164 is movingly disposed in pilot body interior 71 and preferably in snap spring cavity 156. Upper spring plate 164 is slidable in pilot body interior 71, and may be moved downwardly from its position shown in FIGS. 4-8 to shorten the length of snap spring 154, and thus increase the force applied by snap spring 154 upon lower spring plate 126, which, as described herein, applies a force to pilot plug 106 when pilot valve 30 is in snap mode. Upper spring plate 164 can be moved upwardly from the position shown in the FIGURES to lessen the applied force. An adjustment member 166 may be inserted through cap portion 74, and moved to push upper spring plate 164 downwardly to increase the force applied by snap spring 154, or to move upper spring plate 164 upwardly to lengthen spring 154, and decrease the force applied thereby. Upper spring plate 164 may be positioned against upper end 158 of snap spring cavity 156, which will cause application of a minimum force, or may be adjusted downwardly a desired amount until a maximum desired force is applied by snap spring 154. As will be explained in more detail, because the force applied by snap spring 154 is adjustable, the amount of force required to cause pilot valve 106 to move the process control valve from the first to second states can be adjusted, by moving the adjustment member 166 to move upper spring plate 164. In one embodiment, adjustment member 166 may be an adjustment screw 166 threaded through cap portion 174, and rotatable to move upper spring plate 164.

When push rod 142 is engaged with upper sealing ball 108, snap spring 154 will apply a force thereto in a direction to urge sealing ball 108 toward and into engagement with first seat 90. The force applied to pilot plug 106 therefore is the combined force of snap spring 154 and throttle spring 120 when the pilot valve is in snap mode, shown in FIGS. 5 and 6, and the springs, which may be referred to as first and second springs 120 and 154, may be identified as a biasing means for urging sealing ball 108 toward and into engagement with first seat 90. In throttle mode, shown in FIGS. 7 and 8, only first spring 120 acts on first sealing ball 108, and the force applied by snap spring 154 is counteracted by supply gas pressure from throttle supply inlet 100 acting on spring diaphragm 130, which flexes spring diaphragm 130 upwardly so that push rod 142 is disengaged from first sealing ball 108. The biasing means may therefore be referred to as a variable force biasing means, since the force applied to the pilot plug will vary depending on the mode in which the pilot is operating.

The biasing means may also be referred to as an adjustable biasing means since the amount of force applied in snap mode can be adjusted by rotation of adjustment screw 166. When pilot valve 30 is in snap mode and supply gas is delivered through second supply inlet 102, the biasing means applies sufficient force to maintain the first sealing ball 108 in engagement with first seat 90. In throttle mode, supply gas passing through first supply inlet 100 will act upon spring diaphragm 130, and will counteract at least a portion of the force applied by the biasing means. Preferably, supply gas passing through first supply inlet 100 will act upon spring diaphragm 130 to completely counteract the force applied by snap spring 154. The pilot valve is bi-stable in snap mode, meaning that the pilot plug is stable when it is positioned to prevent supply gas from passing through the gas outlet, and is stable when it is positioned to allow full flow of supply gas through the pilot valve. The pilot plug 106 will move between the fully open or fully closed positions instantaneously, and is not stable anywhere therebetween.

A second or lower seat 170 is defined on an actuator 172 which is movably disposed in pilot body interior 71. Actuator 172 has a first or upper end 174 and second or lower end 176. Actuator 172 is mounted to pilot body 70 with a pair of actuator diaphragms 177 comprising first or upper actuator diaphragm 178 and second or lower diaphragm 180. Diaphragms 178 and 180 are preferably made from an elastomer, or Teflon-type material, or other material that will move or flex so that actuator 172 is movable in pilot body interior 71. As is apparent from the drawings, lower end 176 extends through pilot body 70 so that it may be engaged by tangent arm 50.

Actuator 172 may comprise a three-piece actuator including an upper portion 182, which may be pressed in, or otherwise fixed to actuator body portion 184, which in turn may be pressed in, or otherwise fixed to actuator sleeve 186. Lower actuator diaphragm 180 is captured between actuator sleeve 186 and actuator body portion 184 while upper actuator diaphragm 178 is captured between upper portion 182 of actuator 172 and body portion 184. A generally circular groove 188 is defined by central body portion 72 of pilot body 70 and lower or base portion 76. A spacer 190 is positioned in groove 188 and holds upper and lower actuator diaphragms 178 and 180 in place. Spacer 190 has a plurality of openings 192 therethrough so that pilot body interior 71 is communicated with second supply gas inlet 102 therethrough. Supply gas is communicated through openings 191 in actuator 172.

FIG. 9 is a section view which shows a supply passage 194 and a vent passage 196 through pilot body 70. Housing 35 may be configured so that supply gas is provided to supply passage 194 from a passageway 195 in housing 35. Passageway 195 will receive supply gas from a supply entrance that may be positioned on an upper surface of housing 35 so that a gas line can be connected thereto. Opening 199 is for connection to a pressure gauge. Gas is vented through vent passage 196 into a passageway 197, so that gas may be vented through the side of housing 35.

Figure 11:
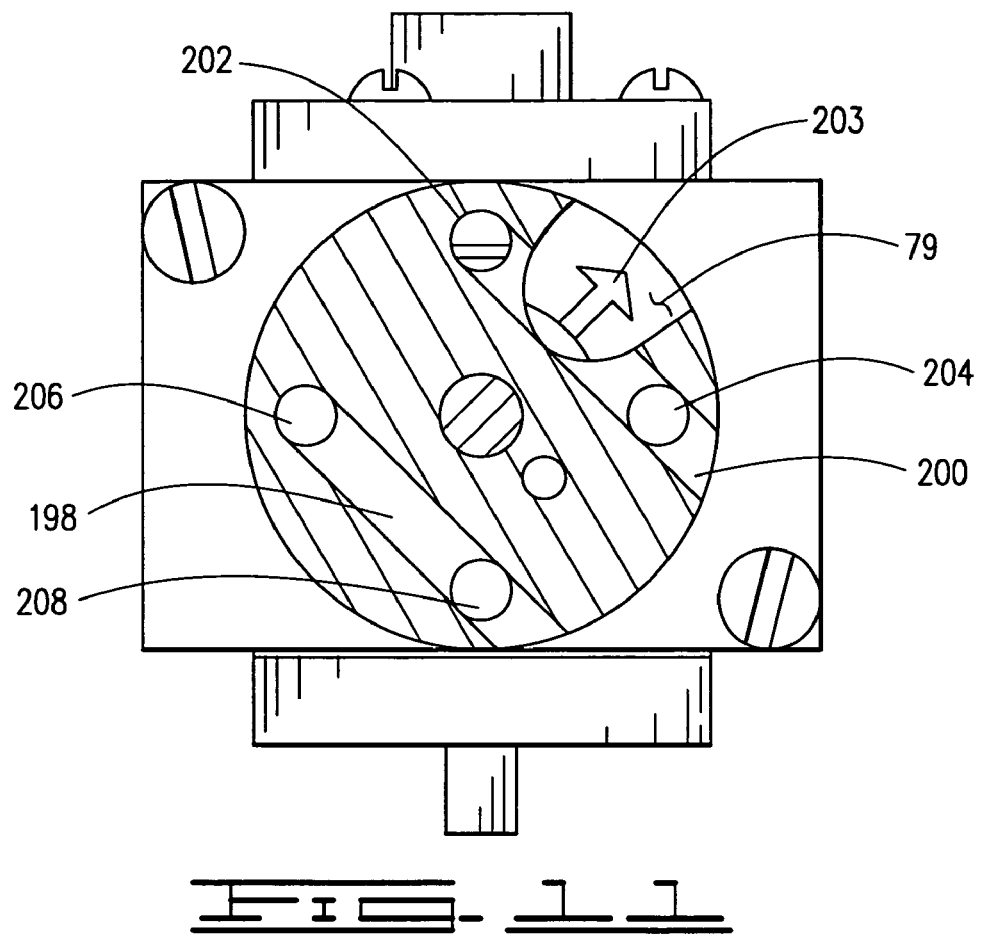
FIG. 11 is a view similar to FIG. 10 in a different mode.
Figure 12:
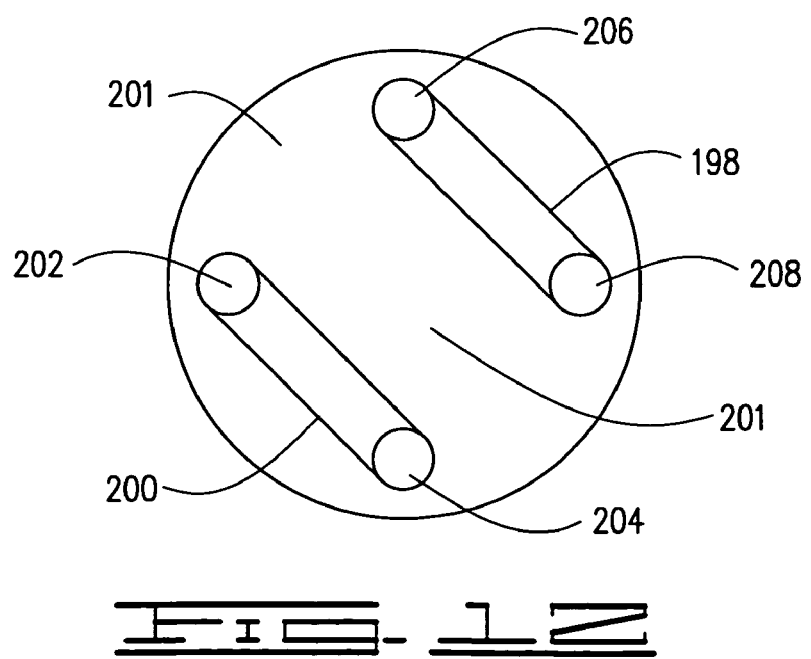
FIG. 12 is a view looking at the inner surface of a switch plate.

As shown in FIGS. 10 and 11 switch plate grooves 198 and 200 are defined on an interior surface 201 of switch plate 78. FIGS. 10 and 11 are views with a portion of switch plate 78 cut away to show grooves 198 and 200. The arrow 203 may be imprinted or otherwise applied to the outer surface 79 of switch plate 78. Groove 200 has openings 202 and 204 at the ends thereof while groove 198 has openings 206 and 208 at the ends thereof.

When switch plate 78 is rotated to the snap mode (FIG. 10) in the embodiment shown, gas supplied to supply passage 194 passes into opening 202 and is communicated through groove 200 and opening 204 into snap supply inlet 102. Vent passage 196 is communicated with opening 208 and thus is communicated with throttle supply inlet 100 through groove 198 and opening 206. In throttle mode, the knob is rotated to the position shown in FIG. 11 so that opening 204 is communicated with supply passage 194 which communicates supply gas through groove 200 into opening 202 and throttle supply inlet 100. In the throttle mode, opening 206 is communicated with vent passage 196 which is communicated with snap supply inlet 102 through groove 198 and opening 208.

When switch plate 78 is rotated so that the pilot valve is in throttle mode, supply gas passes through first gas supply inlet 100 into pilot body interior 71. Supply gas passing through throttle supply inlet 100 will have sufficient pressure to deform spring diaphragm 130 slightly so that it counteracts the downward force acting on push rod 142 by snap spring 154. Throttle spring 120 will continue to apply a downward force to upper plug 108, and therefore to pilot plug 106. No other mechanical force, or manipulation is required to counteract the force applied by snap spring 154, other than the supply gas pressure applied when pilot valve 30 is in throttle mode. Therefore, when the pilot valve 30 is in throttle mode, with supply gas entering through throttle supply gas inlet 100, lower end 152 of push rod 142 will be spaced from upper sealing ball 108. Connecting link 48 will be connected to one of the connecting points 62 on tangent arm 50 on the right, or forward side of pivot point 52.

Figure 7:
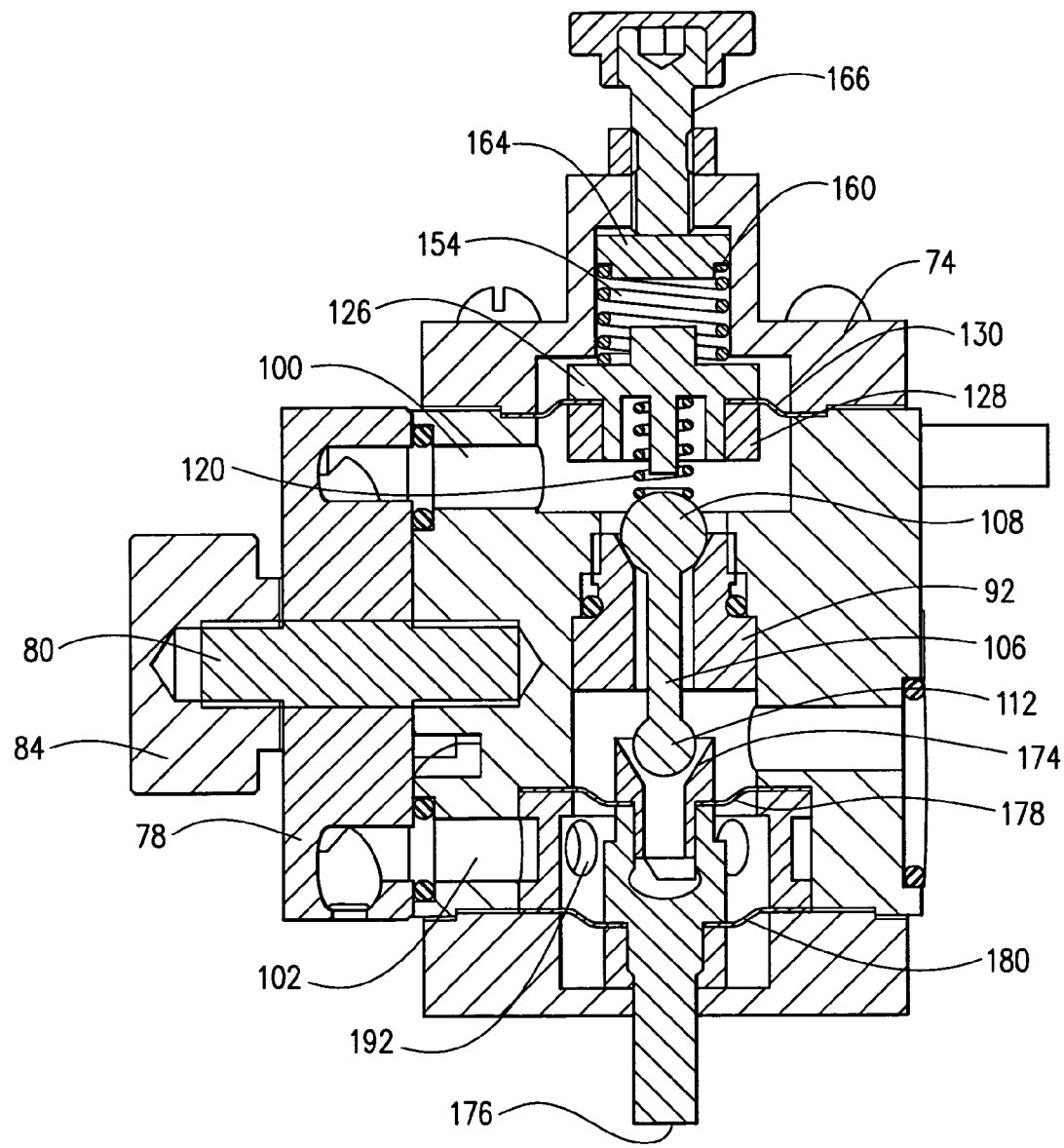
FIG. 7 shows the position of the pilot plug and actuator in the throttle mode when there is not sufficient force from the displacer to cause upward movement of the actuator.

FIG. 7 shows the relative positions of the components of pilot valve 30 in throttle mode when there is no liquid on displacer 25 or when the liquid contacting displacer 25 is not sufficient to move the displacer 25 sufficiently to move actuator 172 upwardly. As the liquid level rises in tank 15, displacer 25 will begin to move when the liquid is at a preselected level. As the displacer 25 moves upwardly, connecting link 48 will begin to move downwardly because of the pivoting motion of waggle arm 46 which will be explained in more detail hereinbelow. Tangent arm 50 will pivot about pivot point 52, so that the left or rear side of tangent arm 50 will move upwardly, and will engage lower end 176 of actuator 172. As the liquid level continues to rise, the force applied to actuator 172 will cause actuator 172 to move upwardly until second seat 170 will engage lower plug 112.

As the liquid level continues to increase in tank 15, second seat 170, which is engaged with the lower sealing plug 112, will urge pilot plug 106 upwardly so that there is a space between upper plug 108 and first seat 90 as depicted in FIG. 8. Supply gas can then begin to flow from first supply gas inlet 100 through passageway 98 into and through gas outlet 104 which is communicated with the process control valve on tank 15. Output gas from gas outlet 104 will be at such a pressure to cause the pressure-operated process control valve to open so that liquid in tank 15 will begin to be discharged therethrough. As the liquid level in tank 15 continues to increase, the space between upper plug 108 and first seat 90 will increase and more output gas pressure is provided to the process control valve. Thus, in throttle mode, output gas is supplied proportionate to the liquid level increase, and the process control valve on tank 15 will open gradually depending on the amount of output gas communicated thereto and can be moved from fully closed to fully open or positioned therebetween. Supply gas will also continue to counteract the downward force applied by snap spring 154 by causing diaphragm 130 to flex upwardly. Once the amount of liquid entering tank 15 begins to slow such that the amount of liquid expelled through the process control valve exceeds that being flowed into the tank 15, the liquid level displacer 25 will drop which will cause a corresponding drop by actuator 172. As actuator 172 drops, first plug 108 will ultimately engage first seat 90, and the actuator 172 will move back to the position shown in FIG. 7. Gas in pilot body interior 71 will be vented through the space between second seat 170 and second sealing ball 112, and through second supply gas inlet 102 into vent passage 196. The gas is communicated into vent outlet 197 and is vented to the atmosphere through housing 35.

Figure 5:
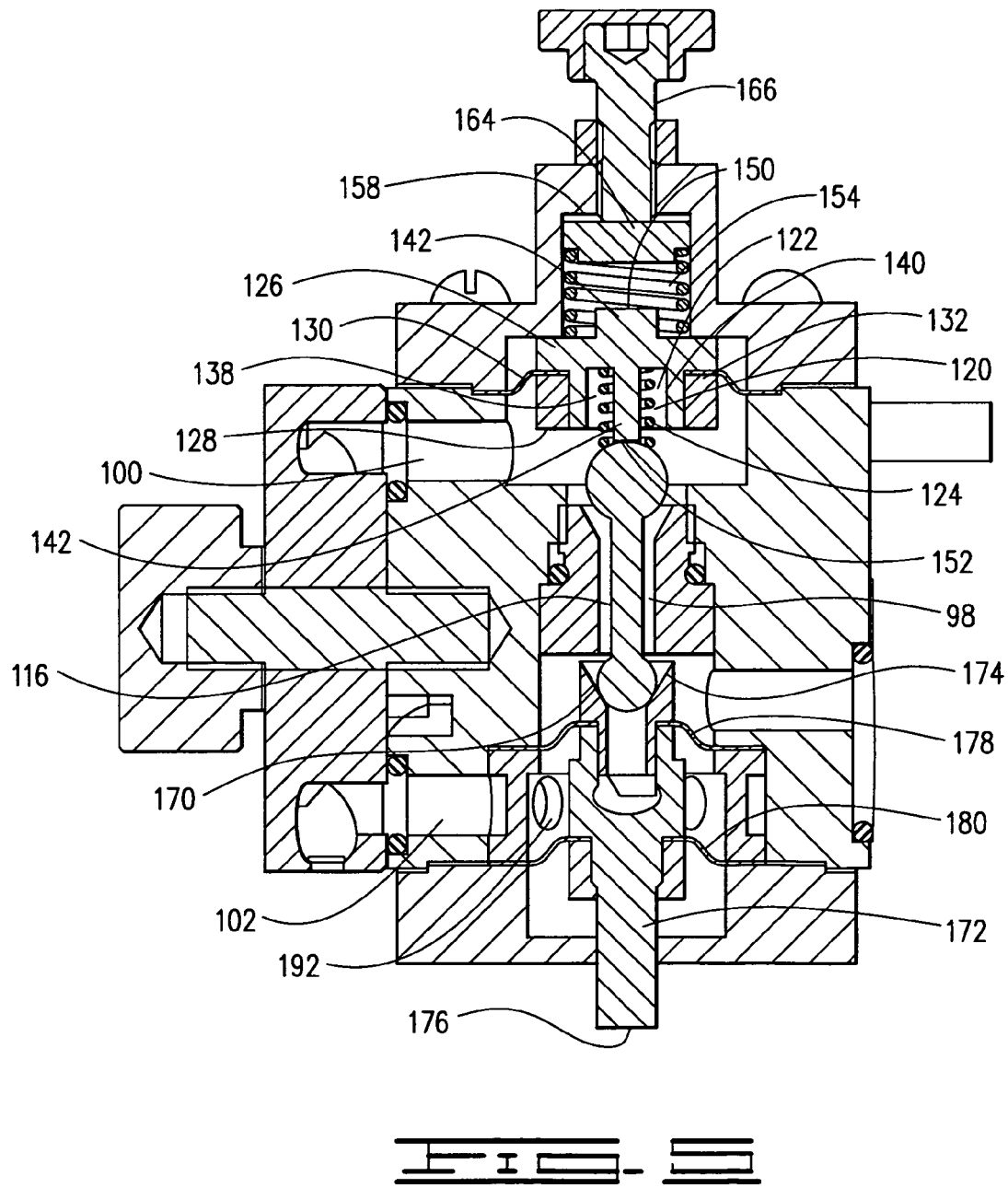
FIG. 5 is a section taken similar to FIG. 3 and shows the position of the pilot plug in snap mode when there is not sufficient liquid on the displacer to disengage the tangent arm from the actuator.
Figure 5:
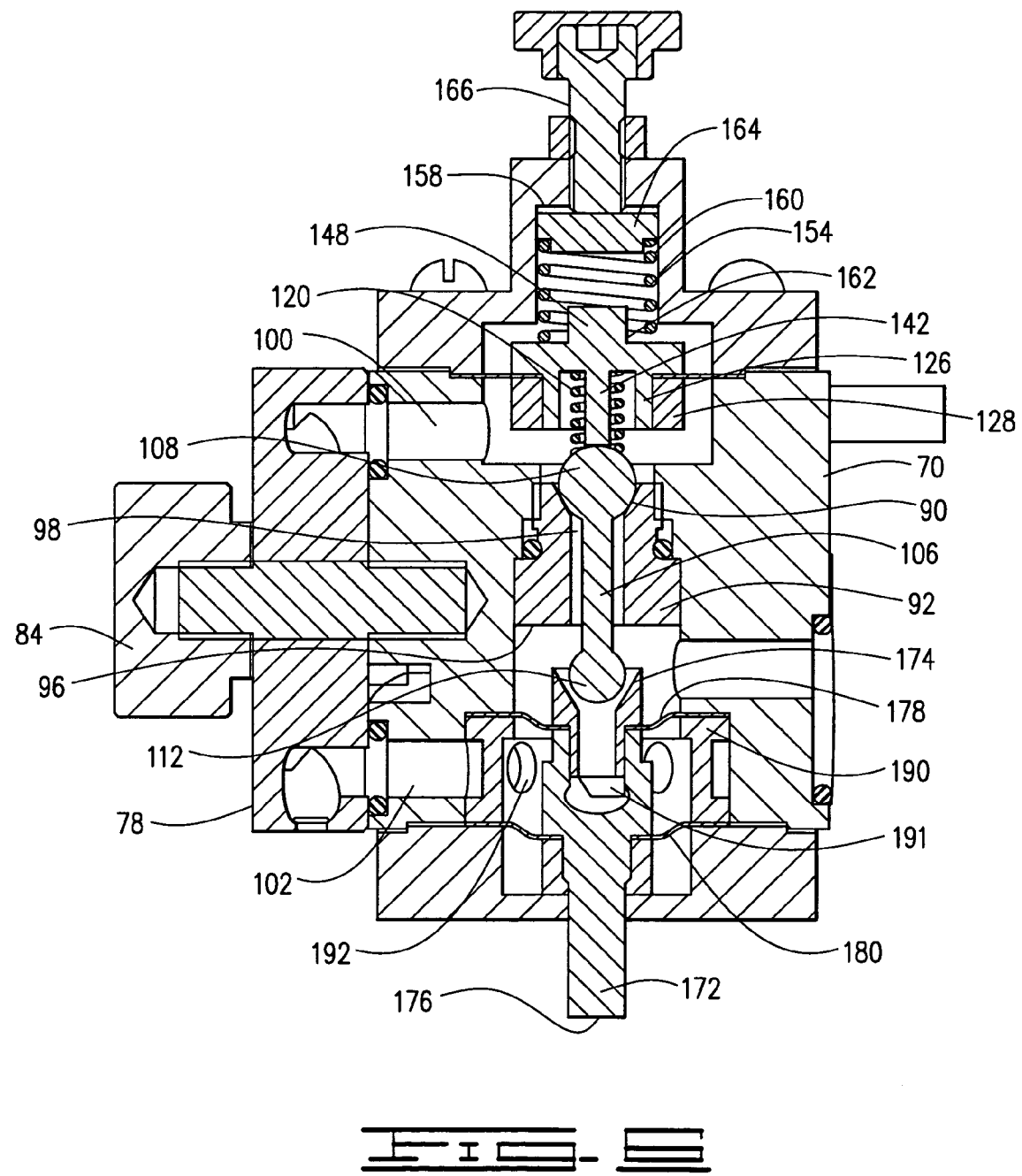

In snap mode, connecting link 48 is positioned so that it is connected to one of connecting points 60 on the left, or rear side of pivot point 52. When the level of liquid in tank 15 is such that it is not contacting displacer 25 sufficiently to move displacer 25 upwardly from a resting position, the position of the components of pilot valve 30 will be as shown in FIG. 5.

When the liquid level rises such that displacer 25 begins to move upwardly, pivoting action of waggle arm 46 will cause connecting link 48 to move downwardly, which will pull tangent arm 50 downwardly on the left side of pivot point 52. Actuator 172 will move downwardly with tangent arm 50 as the liquid level rises in tank 15. In snap mode, supply gas is being supplied through second supply gas inlet 102. Pressure is thus being applied to lower actuator diaphragm 180 and to upper actuator diaphragm 178. Because lower actuator diaphragm 180 has a greater surface area, a greater force is being applied thereto. The liquid level will ultimately increase so that actuator 172 moves downwardly and a space, or passage, between lower seat 170 and lower plug 112 is created so that supply gas passes into actuator 172 and upwardly therethrough. Immediately, or almost immediately after this occurs the space between seat 170 and second plug 112 will increase because actuator 172 will snap downwardly due to the force applied to lower actuator diaphragm 180 and to the top surface of upper actuator diaphragm 178. The opening between seat 170 and lower plug 112 will allow full flow supply gas to pass therethrough. Preferably, the flow rate is a rate sufficient to fully open the process control valve almost immediately after seat 170 disengages lower plug 112. In other words, the rate at which gas passes therethrough in output port 104 will be essentially the same rate that gas is passing into supply inlet 102.

When fluid in tank 15 begins to decrease, connecting arm 48 will rise as displacer 25 falls. Connecting link arm 48 will move tangent arm 52 into engagement with actuator 172. As the liquid level continues to decrease, actuator 172 will ultimately be raised so that it once again engages plug 112. At that point, supply gas from snap supply inlet 102 to gas outlet 104 is shut off, but output gas pressure is still being applied to the process control valve, since the output gas has not vented. The process control valve will therefore not change states. In other words, the process control valve will not yet move from the open to the closed state. As the liquid level continues to decrease, an increased force will be applied by displacer 25 through waggle arm 46 and connecting link 48, until a space is created between first seat 90 and first sealing ball 108, so that gas may be vented through passage 196. Immediately, or almost immediately thereafter the process control valve will be fully closed so that no liquid can escape through the process control valve. In the snap mode, no supply gas is being communicated into pilot body interior 71 through first supply gas inlet 100. As such, snap spring 154 and throttle spring 120 will apply a downward force to pilot plug 106. Snap spring 154 urges push rod 142 downwardly which engages first plug 108 thereby applying a downward force to pilot plug 106. Upper plug 108 will stay fully engaged with first seat 90 when pilot valve 30 is in the position shown in FIG. 5, namely, snap mode where output gas pressure is being supplied to the process control valve from snap supply gas inlet 102 through gas outlet 104. Whether in the throttle or snap mode, gas is vented to the atmosphere when the liquid level falls to a minimum desired level, at which point the components of the pilot valve move such that supply gas to the output gas outlet 104 is blocked and gas pressure is vented.

As provided herein, the downward force applied by the snap spring 154 to pilot plug 106 in snap mode is adjustable. As a result, the amount of upward force that must be applied by actuator 172 to pilot plug 106 to move upper sealing ball 108 away from upper seat 90 is adjustable. Thus, the amount of upward force required to move the process control valve between the first, or open state and the second, or closed state is adjustable. The minimum force applied by snap spring 154 will be when upper spring plate 164 is positioned at the uppermost end 158 of snap spring cavity 156. The force applied by snap spring 154 may be adjusted by rotating adjustment screw 166 to cause upper spring plate 164 to move in snap spring cavity 156. Downward movement of spring plate 164 will compress, or shorten the length of snap spring 154, thus increasing the force applied to lower spring plate 126, and to pilot plug 106, and upward movement of spring plate 159 will decrease such force.

Referring now to FIGS. 1 and 2, waggle arm 46 has first end 210 connected to displacer 25 and has second end 212. Second end 212 may be an enlarged diameter end 213. Enlarged diameter 213 may be referred to as pivot ring 213 and may have a concavity 214 defined therein. A pivot rod 216 has first end 218 and second end 220. First end 218 may define pivot point 219. Pivot point 219 at first end 218 is received in concavity 214. A cover plate 221, which may be a generally U-shaped cover plate 221, has a forward wall 222 with a counterbore 224 therein. Second end 220 of pivot rod 216 is received in counterbore 224. A mounting piece 230 may be utilized to mount housing 35 to a tank 15 as schematically depicted in FIG. 2. Mounting piece 230 may be attached to housing 35 by means known in the art. As is known, mounting piece 230 may be threaded into the vessel, which will have a threaded opening to receive mounting piece 230. Mounting piece 230 has an opening 232 through which waggle arm 46 is received, and has threaded interior 234 into which a connector 236 is threaded. Connector 236 has a passageway 238 through which waggle arm 46 passes.

Pivot ring 213 has an outer diameter 241 and is tightly received in a waggle arm housing 242. Pivot rod 216 is positioned in waggle arm housing 242 which has first and second ends 244 and 246, and has outer diameter 248 and inner diameter 250 through which pivot rod 216 passes. Pivot ring 213 is positioned in waggle arm housing 242, so that movement of second end 212 of waggle arm 46 causes movement of first end 244 of waggle arm housing 242. A bale or wire clip 251 is attached to waggle arm housing 242 and is attached to a tension rod 252. A tensioning plate 254 may be attached to back plate 42 and tension rod 252 may extend therethrough. A tensioning spring 256 may be positioned between tensioning plate 254 and an adjustment knob 259 that is rotatable on tension rod 252. A lock nut 258 is threaded on the end of tension rod 252. Rotation of adjustment knob 259 can adjust the amount of force required to move waggle arm housing 242.

In operation in snap mode, connecting link 48 is attached to one of the connecting points 60 on the left side of pivot point 52. As liquid in tank 15 moves upwardly on displacer 25, first end 210 of waggle arm 46 will move upwardly, and waggle arm 46 will pivot about pivot point 219. First end 244 of waggle arm housing 242 will move upwardly and second end 246 of waggle arm housing 242 will move downwardly as a result of the pivoting motion. Because connecting link 48 is attached at or near the second end 246 to waggle arm housing 242, connecting link 48 will move downwardly as displacer 25 moves upwardly. Waggle arm 46 and waggle arm housing 242 thus comprise a connecting arm for connecting the displacer 25 to connecting link 48, and for transmitting the level changes to actuator 172. As liquid rises, tangent arm 50 on the left side of pivot point 52 will move downwardly to allow actuator 172 to move down, and the pilot valve 30 will operate in snap mode as hereinabove described. When the uppermost desired level is reached, actuator 172 will move away from lower sealing ball 112, and snap supply gas will pass therebetween and through output gas outlet 106. The output gas will open the process control valve. Tension spring 256 may be utilized to adjust the level at which pilot valve 30 will snap on, or move the process control valve to the open state. For example, adjustment knob 259 may be rotated to compress tension spring 256 and increase the downward pull on end 246 of waggle arm housing 242, or can be rotated to increase the length of spring 256 and lessen the downward pull on second end 246 of waggle arm housing 242. When more downward pull is applied by tension spring 256, less force is needed from displacer 25, so the level at which pilot valve 30 will snap open is lower than when less pull is applied. Tension spring 256 is thus a counterbalance spring 256.

When the liquid level begins to fall, second end 246 of waggle arm housing 242 which is the second end of the connecting arm, will pivot upwardly. Second end 246 will move upwardly as will connecting link 48, which will move tangent arm 50 upwardly into engagement with actuator 172. When actuator 172, and more specifically, when lower seat 170 engages lower sealing ball 112, supply gas delivered through second supply inlet 102 will be shut off, since the passage between lower seat 170 and lower sealing ball 112 is closed. However, output gas pressure will continue to be applied to the process control valve. As such, the process control valve will not, at that time change states, for example, from the first, or open state to a closed state. As the liquid level continues to fall, an increased force will be applied by displacer 25, through waggle arm 48 and waggle arm housing 242, and connecting link 48 to tangent arm 50. The force will be transmitted to actuator 172, and ultimately will be sufficient to move the actuator 172 upwardly so that upper sealing ball 108 will disengage from upper seat 90. Output gas will vent through the space therebetween, thus venting the output gas pressure, and allowing the process control valve to move from the first, or open state to the closed state.

When snap spring 154 is adjusted to apply minimum force to pilot plug 106 with upper spring plate 164 positioned at the upper end 158 of snap spring cavity 156, the level change between an uppermost level and the lowermost level will be a minimum level change. When spring 154 is adjusted to apply a maximum force to pilot plug 106, the level change will increase, since more force, which is applied by the displacer as the liquid level falls, is required to move actuator 172 so that first sealing ball 108 disengages from first seat 90 to move the process control valve back to the second or closed state.

Pilot valve 30 is therefore an adjustable pilot valve that in snap mode provides for a range of level changes. When upper spring plate 164 is at its uppermost position, spring 154 applies a minimum force to lower spring plate 126, which in turn applies the minimum force to pilot plug 106. As the liquid level drops, tangent arm 50 will engage actuator 172, and will apply an upward force to actuator 172, which will engage and act upon pilot plug 106 through lower sealing ball 112. The upward force increases as the liquid level falls until the upward force overcomes the downward force applied by snap spring 154 to move upper sealing ball 108 away from upper seat 90. Output gas pressure vents through the space therebetween, so that no output gas pressure is applied to the process control valve, which will move to the second, or closed state. When using a displacer with a weight of approximately thirty ounces in a tank with water therein the level change when minimum force is applied may be, for example, about 4.5 inches.

If a greater level change is desired, adjustment screw 166 can be rotated to shorten snap spring 154, which will increase the force applied to pilot plug 106. As a result, greater external force must be applied to actuator 172 to move upper sealing ball 108 of upper seat 90. As the liquid level drops, the displacer will ultimately apply enough force to the connecting arm 48 on tangent arm 40, which moves actuator 172 upwardly until, as described herein, pilot valve 30 ceases to apply output gas pressure to the process control valve so that the process control valve closes. A maximum level change may be, for example, nine inches, with the displacer and fluid described above. Upper spring plate 164 can be positioned to provide for a level change at a maximum, or minimum, or anywhere in between. Thus, the adjustment for snap spring 154 provides for an adjustment that allows the pilot valve to operate over a range, or span of level changes, while the tension spring 256 allows for the level at which the process control valve opens to be slightly adjusted.

The pilot valve 30 may thus be described as an adjustable pilot valve that provides for an adjustment to the external force necessary to open passages therein. When output gas is being supplied through the pilot valve to a process control valve, the process control valve will remain in its first state. The opposing force required to vent the output gas pressure is adjustable, since the force applied by snap spring 154 that keeps the passage between the upper sealing ball 108 and upper seat 90 closed is adjustable. When used with liquid level controller 10, the force is as a result of the vertical displacement of displacer 25, and the force applied is transmitted through waggle arm 46, waggle arm housing 242, connecting link 48, and tangent arm 50. The pilot valve thus provides for an adjustment to the external force required to allow the pilot valve to move a process control valve from one state to a second state, such as an open to a closed state.

Thus it is seen that the present invention is well adapted to carry out the objects and attain the ends and advantages mentioned above as well as those inherent therein. While certain preferred embodiments of the invention have been described for the purpose of this disclosure, numerous changes in the construction and arrangement of parts and the performance of steps can be made by those skilled in the art, which changes are encompassed within the scope and spirit of this invention as defined by the appended claims.

What is claimed is:

1. A pilot assembly comprising:
   a pilot body defining a pilot body interior, and defining a first and second supply gas inlet and a single output gas outlet for providing output gas to a process control valve to regulate the flow of liquid from a vessel having liquid therein;
   a switch movable between first and second positions for selectively switching the pilot valve from a first to a second mode, wherein in the first mode supply gas is communicated to the first supply inlet and in the second mode supply gas is communicated to the second supply inlet;
   a pilot plug disposed in the pilot body interior, the pilot plug comprising an upper sealing ball engageable with an upper seat in the pilot body interior, and a lower sealing ball connected to the upper sealing ball by a pilot plug stem;
   a movable actuator disposed at least partially in the pilot body interior and defining a lower seat engageable with the lower sealing ball, the upper sealing ball being engaged with the upper seat and the lower sealing ball being disengaged from the lower seat to define a passage for supply gas from the second supply inlet when the pilot valve is in the second mode and supply gas is directed through the output gas outlet to position the process control valve in a fully open position, wherein the actuator is movable upwardly in response to a mechanical force applied thereto as a result of a liquid level change in the vessel so that the actuator will engage the lower sealing ball and close the passage for supply gas and move the pilot plug upwardly to disengage the upper sealing ball from the upper seat to vent the output gas and move the process control valve to a fully closed position; and a biasing means for applying a force to the upper sealing ball in a direction toward the upper seat to oppose the mechanical force applied to the actuator, wherein the biasing means is adjustable such that the amount of force applied to the pilot plug can be adjusted thereby adjusting the amount of opposing mechanical force that must be applied by the actuator to disengage the upper sealing ball from the upper seat and move the process control valve to the fully closed state.

2. The pilot assembly of claim 1, further comprising an adjustment screw extending into the pilot body interior, the biasing means comprising a snap spring disposed in the pilot body interior for applying a force to the pilot plug, wherein rotation of the adjustment screw in a first direction increases the force applied by the snap spring on the pilot plug, and rotation of the adjustment screw in a second direction decreases the force applied by the snap spring on the pilot plug.

3. The pilot assembly of claim 2 further comprising an upper spring plate slidably disposed in the pilot body interior and engaged with an upper end of the snap spring, wherein the adjustment screw engages the upper spring plate.

4. The pilot assembly of claim 3, further comprising a lower spring plate disposed in the pilot body interior, wherein the snap spring is positioned between the upper and lower spring plates, and the lower spring plate engages the upper sealing ball.

5. The pilot assembly of claim 1, further comprising a tangent arm pivotable relative to the actuator, wherein the tangent arm will apply the force to the actuator to move the actuator and the pilot plug upwardly to disengage the upper sealing ball from the upper seat.

6. A pilot assembly comprising:
a pilot body defining a pilot body interior;
first and second gas supply inlets and a single output gas outlet defined by the pilot body for supplying gas to a process control valve;
a pilot plug movably disposed in the pilot plug body, the pilot plug comprising an upper sealing ball and a lower sealing ball connected by a pilot plug stem;
an actuator movable in the pilot body interior, the actuator defining a lower seat engageable with the lower sealing ball;
a seat body affixed in the pilot body interior defining an upper seat engageable with the upper sealing ball;
a spring disposed in the pilot body interior for applying an adjustable force to the upper sealing ball in a direction toward the upper seat; and,
an adjustment member for adjusting the length of the spring in the pilot body interior to increase or decrease the amount of force applied by the spring to the pilot plug thereby changing the amount of an applied mechanical force required to overcome the force applied by the spring to move the actuator in a direction opposite the force applied by the spring.

7. The pilot assembly of claim 6, the adjustment member comprising an adjustment screw threaded through the pilot body.

8. The pilot assembly of claim 7, further comprising an upper spring plate movable in the pilot body and contacting an upper end of the spring, wherein rotation of the adjustment screw will move the upper spring plate and adjust the length of the spring.

9. The pilot assembly of claim 6, further comprising:
an upper spring plate slidably disposed in the pilot body interior;
wherein the adjustment member will move the upper spring plate in the pilot body interior, and wherein movement of the upper spring plate will adjust the amount of force applied by the spring to the upper sealing ball.

10. The pilot assembly of claim 9, further comprising a lower spring plate movably disposed in the pilot body interior, wherein the spring is disposed between the upper and lower spring plates.

11. The pilot assembly of claim 6, the pilot assembly being selectively switchable between a first mode and a second mode, wherein gas is supplied to the first inlet in the first mode and to the second inlet in the second mode, and wherein the force applied by the spring for applying an adjustable force to the upper sealing ball is counteracted by the supply gas pressure from the first inlet so that no force is applied thereby in the first mode.

12. The pilot assembly of claim 11, wherein in the second mode gas is supplied through the second supply inlet and the spring for applying an adjustable force applies an adjustable force to the upper sealing ball.

13. A pilot valve assembly for supplying gas to a pneumatically operated process control valve movable between fully open and fully closed positions upon the application and cessation of output gas pressure from the pilot valve assembly to allow and stop liquid flow from a vessel with which the process control valve communicates comprising:
a pilot body defining a pilot body interior, a snap supply gas inlet for communicating snap supply gas to the pilot body interior, and an output gas outlet for communicating output gas to the process control valve;
a movable pilot plug comprising an upper sealing ball, a lower sealing ball, and a pilot plug stem connecting the upper and lower sealing balls, the upper sealing ball being engageable with an upper seat in the pilot body interior;
a movable actuator disposed in the pilot body interior, the movable actuator defining a lower seat engageable with the lower sealing ball, the lower seat and lower sealing ball defining a passage therebetween when disengaged for permitting supply gas passing through the snap supply gas inlet to pass through the pilot body interior to the output gas outlet so that output gas pressure will move the process control valve to its fully open position, the upper sealing ball being engaged with the upper seat when snap supply gas is being communicated to the output gas outlet wherein the actuator is urged in a direction toward the pilot plug by a mechanical force external to the pilot valve as a liquid level in the vessel decreases to move the lower seat into engagement with the lower sealing ball; and
a biasing member for applying force to the pilot plug to resist movement of the upper sealing ball away from the upper seat when snap supply gas is being communicated to the output gas outlet, wherein the force applied by the biasing member is an adjustable force to provide a range of liquid levels over which the pilot valve will move to the closed position.

14. The pilot valve of claim 13 further comprising an upper spring plate movably disposed in the pilot body interior, wherein movement of the upper spring plate adjusts the force applied by the biasing member to the pilot plug.

15. The pilot valve of claim 14, wherein the biasing member is a spring with upper and lower ends, the upper spring plate being in contact with the upper end of thespring.

16. The pilot valve of claim 14, further comprising a lower spring plate disposed in the pilot body interior wherein the biasing member comprises a spring positioned between the upper and lower spring plates.

17. The pilot assembly of claim 16, the lower spring plate being engageable with the pilot plug, wherein the spring applies a force to the pilot plug with the lower spring plate when the spring plate is engaged with the pilot plug.

18. The pilot valve of claim 13, wherein a force applied to the actuator will move the actuator toward and into engagement with the second seat to close the passage, and will move the pilot plug upward to disengage the first sealing ball from the first seat, the process control valve moving from the first state to the second state in response to the disengagement of the upper sealing ball and upper seat.

* * * * *